April 25, 1967 E. MEILI ET AL 3,316,410
APPARATUS FOR DETECTING THE PRESENCE
OF AEROSOLS AND THE LIKE IN AIR
Filed July 12, 1965 2 Sheets-Sheet 1

INVENTORS:
ERNST MEILI AND
BY THOMAS LAMPART
Werner W. Kleeman
Attorney

United States Patent Office 3,316,410
Patented Apr. 25, 1967

3,316,410
APPARATUS FOR DETECTING THE PRESENCE OF AEROSOLS AND THE LIKE IN AIR
Ernst Meili, Kusnacht, and Thomas Lampart, Mannedorf, Switzerland, assignors to Cerberus A.G., Mannedorf, Switzerland, a corporation of Switzerland
Filed July 12, 1965, Ser. No. 471,317
Claims priority, application Switzerland, July 14, 1964, 9,233/64
12 Claims. (Cl. 250—218)

The present invention has reference to an improved apparatus for detecting aerosols in an atmosphere, particularly air. Under the term aerosols there is to be understood particles suspended in air which are preferably smaller than $10\mu$ (microns) in size. They result from practically all combustion processes.

The measurement of the aerosol content of air can serve to activate an automatic fire alarm upon reaching a certain concentration. Furthermore, it is possible to indicate and/or cause switching-in of ventilator devices upon reaching a concentration threshold or air contamination known to be dangerous, for instance brought about by the waste gases of vehicle combustion motors in closed structures, such as tunnels, garages or the like.

Measurement of the aerosol content can be undertaken in different ways. What is already known, for example, are methods which rely upon ionization chambers and optical devices. With optical monitoring there can principally either be determined the weakening of a bundle of light rays by the aerosols or the scattering or dispersion of the light rays by the aerosols.

Apparatuses which rely upon the scattering of light (Tyndall effect) by the aerosols have already been known for quite some time. They use a continuously operating incandescent lamp and for photometry a photoelectric cell or a semi-conductor element.

Now, the present invention has for one of its primary objects to provide a marked improvement of the known devices.

A further important object of the present invention is to provide an improved apparatus for detecting aerosols in the air in a highly efficient and reliable manner.

Still another considerable object of this invention is directed to the provision of an improved apparatus for detecting aerosols in air which possesses considerable longevity and troublefree operation, and is extremely precise in its measuring accuracy.

Characteristic of the inventive apparatus is that the light source is intermittently illuminated for short periods of time. An essential concept behind doing this is that it is not necessary to maintain the light source continually in operation since sufficient monitoring can also be ensured if such is only switched-in briefly at more or less long time intervals. For instance, 2 seconds or less, can be chosen as the switching-in duration.

An important advantage of this measuring technique resides in the fact that the length of life of the light source e.g. incandescent lamp is quite considerably increased and the energy consumption for operating the fire alarm becomes smaller.

An increase in longevity is very desirable since the alarms used for supervising spaces or rooms are arranged in scattered fashion and often poorly accessible at the ceilings. The energy consumption is of particular importance for security installations because such installations must also be operated when there is a breakdown of the power network supply for longer periods of time. For this purpose emergency power supply accumulators are employed which, for reasons of economy, are desired to be as small as possible.

In order to limit the first-mentioned disadvantage the known devices oftentimes have the incandescent lamps operating at undervoltage. Naturally, this manner of operation can be also additionally utilized in the inventive arrangement.

A specific embodiment of the invention resides in the fact that the light source does not transmit a constant light as was the case with the previously mentioned known systems, rather transmits a modulated light of a certain frequency, and the light sensitive element and the amplifier connected thereto selectively only respond to such frequency. Thus disturbing effects due to foreign light can be considerably eliminated. As a result, it is no longer necessary to construct the measuring compartment to be absolutely light-tight. Consequently, a construction of the measuring compartment can be chosen which considerably makes easier entry of the air to be monitored.

Advantageously, a measuring frequency is selected which considerably or as a multiple deviates from the normal network frequency, in order to eliminate as far as possible disturbing influences. The described modulated light can, according to the invention, be emitted continuously or in impulses, in both cases the scattered light receiver is constructed to be frequency selective. It is also conceivable to use, in lieu of a certain frequency, a predetermined impulse image for coding. In this manner there is achieved a still greater security against false alarms.

Furthermore, intermittent measurements render possible the use of gas-filled tubes as light source. Preferably, flashlight tubes are used in the manner as they are, for example, employed in electronic flash apparatus. They characterize themselves by their exceptionally high life since they do not require any heated filaments for heating or light generation.

A further very important improvement of the inventive apparatus resides in the feature that for measuring the aerosol content there is employed a very short light wave length, for instance ultraviolet light. By utilizing a gas-discharge tube this can be easily realized. Since many combustion processes, particularly those with open flames, primarily generate very small suspended particles it is of interest to also detect such. It is known, however, that the shorter the wave length of the light the more strongly is the light scattered by small particles.

The functional relationship between the intensity of the scattered light, the particle size and the wave length of the incident light, is known from the formula:

$$I = \frac{128\pi^5}{3\lambda^4} v I_o a^2$$

wherein:

$I$ = the intensity of the scattered light
$I_o$ = the intensity of the incident light
$\lambda$ = the wave length of the incident light
$v$ = the number of scattering particles per cubic centimeter
$a$ = the polarizability The scattered light intensity is thus inversely proportional to the fourth power of the wave length and directly proportional to the polarizability of the particles. The polarizability is directly proportional to the size of the aerosols.

Assuming that the light source generates ultraviolet light then in contrast to the known fire alarms with incandescent lamps, it is also possible to detect small particles and a considerably larger scattered light intensity is available. A consequence of this is a considerable increase in the sensitivity and operational reliability. Additionally, it is also possible in this case, insofar as the light sensitive element only responds to ultraviolet light, to again dispense with a complete screening of the measuring compartment from the surrounding light. The usually conventional light diaphragms are thus dispensed with and easier penetration of the air to be monitored is possible.

The light-sensitive element can advantageously be a semi-conductor element or a photoelectric cell. The latter is recommended when working with ultraviolet light.

Only for the purpose of completeness it is still mentioned that as light source, in addition to incandescent lamps and gas-filled tubes, there can also be selected a light-emitting semi-conductor. Such is particularly suited for generating alternating light of high frequency.

So as to be able to supervise the constant operation of the light source it is contemplated that light emitted from the light source directly impinges upon a further light sensitive element. Upon interruption of the emission of light a disturbance signal should be triggered.

Other features, objects and advantages of the invention will become apparent by reference to the following detailed description and drawings wherein like reference characters have been used for substantially the same or analogous elements throughout the various embodiments, and in which:

FIGURE 1 schematically illustrates an apparatus for explaining the operational principles of the present invention;

Figure 5:
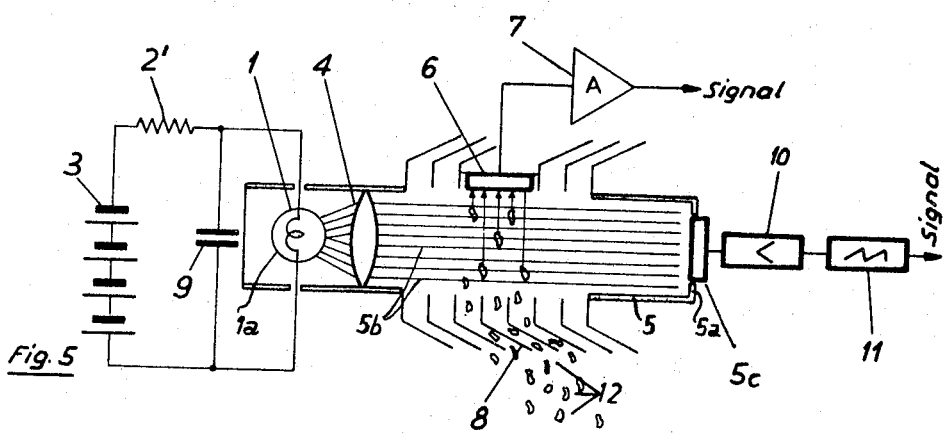
Figure 6:
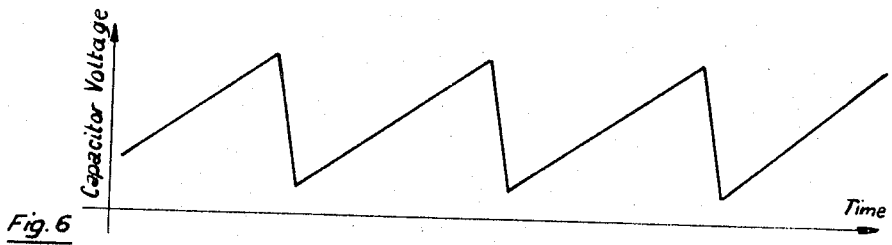

FIGURE 5 schematically illustrates a further embodiment of inventive apparatus utilizing a gas-filled tube as light generator;

FIGURE 6 is a graph depicting the applied voltage as a function of time; and

Figure 7:
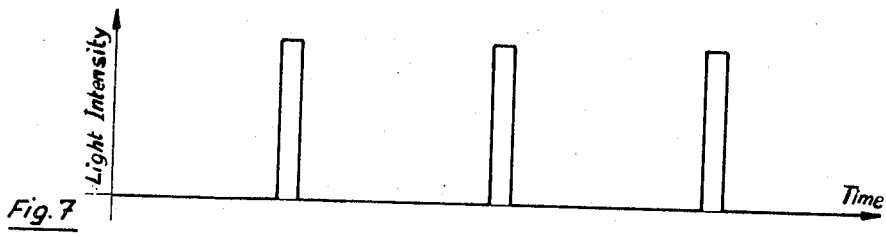

FIGURE 7 is a graph depicting light intensity or light emission of the gas-filled tube as a function of time.

Figure 1:
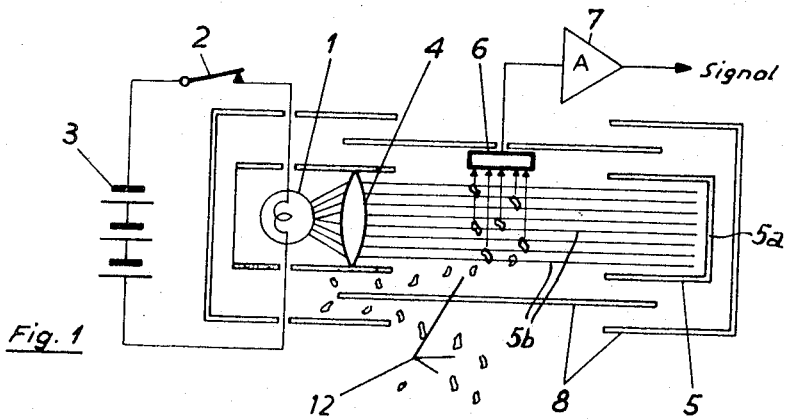
Figure 2:
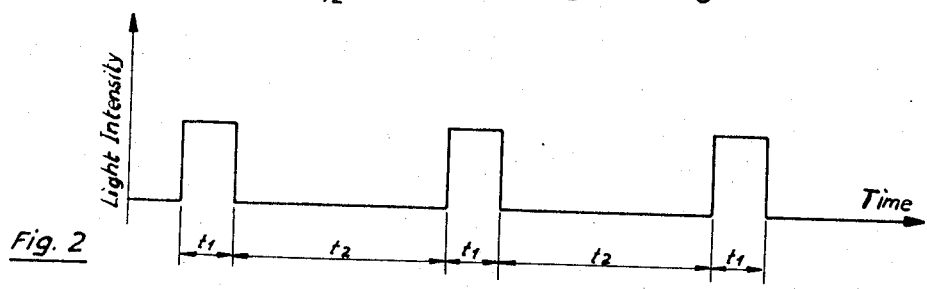
FIGURE 2 is a graph plotting the series of light pulses as a function of time.

Describing now the drawings and directing attention initially to FIGURE 1, it will be recognized that a light source 1 is connected via a switch or contact 2 with a suitable voltage source 3. Contact 2 is periodically opened and closed. FIGURE 2 depicts the time diagram for illumination of the light source 1. Specifically, along the abcissa there is plotted time and along the ordinate light intensity. During the time $t_1$, which can amount to 2 seconds or less, the contact 2 is closed. During time $t_2$ it is opened and the light source 1 is switched-out. The value of $t_2$ can amount to a number of seconds. Light emitted from the light source 1 is bunched by the lens or optical system 4 and transmitted as parallel rays 5b into a light-absorbing cylinder 5 closed at one end 5a. The cylinder 5 should prevent the formation of light reflections which could impair the measurement.

A light sensitive element 6 e.g. photoelement is mounted outside of the bundle of light rays 5b. In the path of the rays 5b between the lens 4 and the light-absorbing cylinder 5 there is achieved, due to the presence of aerosols 12 entering via the slits between the diaphragm 8 from the air surrounding the apparatus, light dispersion or scattering at the light sensitive element 6, whereby the same is illuminated. On the other hand, if no aerosols 12 are located in the path of rays 5b then the photoelement is not illuminated. The electrical signal generated at the light sensitive element 6 upon the presence of aerosols 12, is amplified at a conventional amplifier 7 in such a manner that upon reaching a certain threshhold value a signal is triggered. This signal is utilized for giving an alarm in a non-illustrated alarm apparatus. It will be appreciated that the optical portion of the device is screened by the diaphragm 8 such that no foreign light can penetrate.

Figure 3:
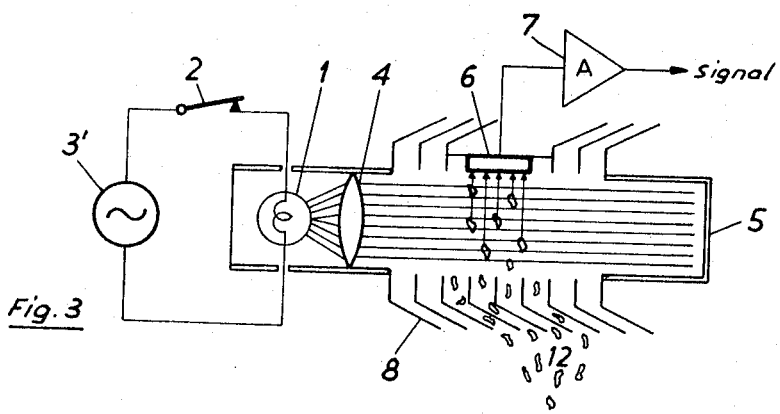
FIGURE 3 illustrates a preferred embodiment of inventive apparatus employing a modulated light source.

The apparatus according to FIGURE 3 substantially corresponds in construction to that of FIGURE 1, for which reason the same reference characters are again employed for like or analogous components. However, the light source 1 is here modulated with the frequency $f_1$. A transistorized oscillator 3' is preferably used for voltage generation.

Figure 4:
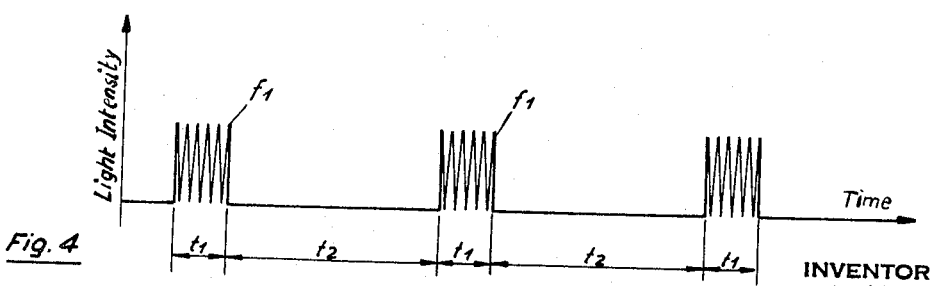
FIGURE 4 is a further graph depicting the series of light pulses as a function of time.

The corresponding time diagram can be seen by inspecting FIGURE 4. Again time is plotted along the abscissa and light intensity along the ordinate. Here also the contact or switch 2 is closed during the time $t_1$ so that the light source 1 transmits a modulated light impulse having the frequency $f_1$. During the time $t_2$ the switch 2 is opened and the light source 1 switched-out. It is also readily possible to replace the switch 2 by a fixed connection, so that the light source 1 is continually connected with the oscillator 3'. Consequently, the light source 1 continuously illuminates intermittently for short periods of time with the modulation frequency $f_1$. The selective amplifier 7 only amplifies the signals with frequency $f_1$ generated by the light sensitive element 6 and delivers a signal to the non-illustrated alarm device. Due to this coding of the light it is possible to considerably more favorably configure the outer diaphragm 8 with regard to easy entry of air. It must only prevent direct light and in particular light reflections from influencing the light sensitive element 6.

FIGURE 5 depicts an embodiment of inventive apparatus using a gas-filled tube 1a as the light source 1. The direct-current voltage 3 charges a capacitor 9 via a resistor 2', which members 2', 9 may be considered to provide a switch means. Upon reaching the ignition voltage of the tube 1a such becomes conductive and the electrical energy stored in the capacitor 9 discharges via the tube 1a. This delivers a flash of light. It is here remarked that the term "switch or switch means" as employed herein, is used in a broader sense to encompass not only the usual mechanical or electronic switches, but also the RC-member of FIGURE 5, and generally, structure capable of intermittently turning on and off the light source.

FIGURE 6 graphically depicts the voltages appearing across the capacitor 9. Such is principally a saw-tooth shaped capacitor voltage. From FIGURE 7 there can be seen the emission of light of the tube 1a as a function of time. This figure shows the light impulses of the light source 1 as a function of the saw-tooth voltage at the capacitor 9. An advantage of the circuit worth mentioning is that due to the very small charging current of the capacitor 9 the voltage source 3 is only slightly loaded although for the performance of the measuring operation a very strong light source is available.

The light emitted from the gas-filled tube 1a is again bundled by the optical lens 4 and is thrown into the reflection-free cylinder 5 onto a light sensitive element 5c. The latter serves to supervise the light source 1 as to correct mode of operation. The electric signal generated by the light sensitive element 5c—insofar as necessary— is amplified by an amplifier 10 and delivered to a conventional integrating element 11, for instance a capacitor. The continuously arriving signal generates a certain voltage level or peak. If the signal is missing then the level drops and a disturbance signal is triggered which indicates the reductions or disappearance of light emission of the tube 1a. As previously explained, the other light sensitive element 6 with amplifier 7 monitors the presence of aerosols 12 in the light rays 5a, in the manner already described in conjunction with FIGURES 1 and 3. Insofar as the tube 1a emits ultraviolet light the light sensitive element 6 is preferably a photoelectric cell.

Finally, there is still pointed out the possibility that the light sensitive element 6 can be influenced by the control device (switch 2 or resistor 2', oscillator 3' or voltage source 3, capacitor 9) in such a manner that it is only switched-in during light emission by the light source 1. As a result, the advantage is obtained that during the dark phase of the light source 1 a non-desired and disturbing foreign light which can penetrate the measuring compartment from the outside via the intermediate spaces of the diaphragm means 8, does not trigger error signals via the light sensitive element 6. This holds true for all of the illustrated embodiments.

Mention is further made of the fact that by appropriate modification of the circuit for supplying the tube 1a modulation of the emitted light can take place in such a manner that it corresponds to the time diagram for light generation depicted in FIGURE 4.

It is again indicated that in all of the embodiments disclosed the light sensitive element 6 can be a photoelectric cell or a semi-conductor element. Moreover, such light sensitive element can be of the type which only responds to light of a certain frequency. It will also be appreciated and specifically understood that the different embodiments are also individually or collectively capable of combination insofar as such do not oppose one another.

While there is shown and described present preferred embodiments of the invention it is to be distinctly understood that the invention is not limited thereto but may be otherwise variously embodied and practised within the scope of the following claims.

What is claimed is:

1. In an apparatus for determining the presence of aerosols in air, the combination of: a light source for emitting a beam of light rays, a light sensitive element arranged outside of the beam of light rays emitted by said light source for measuring the scattered light produced by the aerosols, and switch means for intermittently illuminating said light source for short periods of time.

2. In an apparatus for determining the presence of aerosols in air as defined in claim 1 wherein said light source is illuminated by said illuminating means for a period of time which is less than two seconds.

3. In an apparatus for determining the presence of aerosols in air as defined in claim 1 wherein said illuminating means includes a main voltage, said light source emitting a modulated light of a certain frequency which is different from the frequency of the main voltage and its harmonic frequencies, said light sensitive element being constructed to selectively respond to the modulation frequency of said modulated light emitted by said light source.

4. In an apparatus for determining the presence of aerosols in air as defined in claim 1 wherein said light sensitive element is only placed into operation when said light source emits light.

5. In an apparatus for determining the presence of aerosols in air as defined in claim 1 wherein said light source comprises a gas-filled tube.

6. In an apparatus for determining the presence of aerosols in air as defined in claim 5 further including a capacitor connected in parallel with said gas-filled tube, a resistor connected in series with said capacitor for charging the latter, said capacitor periodically discharging via said gas-filled tube to thereby generate flashes of light.

7. In an apparatus for determining the presence of aerosols in air as defined in claim 1 wherein said light source is constructed to emit ultraviolet light.

8. In an apparatus for determining the presence of aerosols in air as defined in claim 1, wherein said light sensitive element is a semi-conductor element.

9. In an apparatus for determining the presence of aerosols in air as defined in claim 1, wherein said light sensitive element is a photoelectric cell.

10. In an apparatus for determining the presence of aerosols in air as defined in claim 1, including a further light sensitive element positioned to directly receive light emitted by said light source in order to continuously monitor operation of said light source.

11. In an apparatus for determining the presence of aerosols in air as defined in claim 10 further including means cooperating with said further light sensitive element for triggering a disturbance signal when said light source fails to emit light.

12. In an apparatus for determining the presence of aerosols in air as defined in claim 1 further including amplifier means cooperating with said light sensitive element.

References Cited by the Examiner
UNITED STATES PATENTS

| | | | |
|---|---|---|---|
| 1,971,443 | 8/1934 | Exton | 88—14 |
| 2,241,743 | 5/1941 | Schoene | 250—218 |
| 2,436,262 | 2/1948 | Miller | 88—14 |
| 2,562,181 | 7/1951 | Frommer | 88—14 |
| 2,654,845 | 10/1953 | Presenz | 250—218 |
| 2,806,148 | 9/1957 | Barton | 250—218 |

RALPH G. NILSON, *Primary Examiner.*

M. ABRAMSON, *Assistant Examiner.*